(12) United States Patent
Vargantwar

(10) Patent No.: US 8,369,297 B1
(45) Date of Patent: Feb. 5, 2013

(54) SYNCHRONIZED DETERMINATION OF RATE CONTROL AMONG USERS IN A WIRELESS COMMUNICATION SYSTEM

(75) Inventor: Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 335 days.

(21) Appl. No.: 12/860,984

(22) Filed: Aug. 23, 2010

(51) Int. Cl.
*H04B 7/216* (2006.01)

(52) U.S. Cl. ......................................................... 370/338

(58) Field of Classification Search .................. 370/320, 370/328–339, 341, 350, 441; 455/13.4, 522
See application file for complete search history.

(56) References Cited

U.S. PATENT DOCUMENTS

| | | | |
|---|---|---|---|
| 6,970,437 B2 * | 11/2005 | Lott et al. | 370/318 |
| 7,072,630 B2 * | 7/2006 | Lott et al. | 455/151.2 |
| 7,764,651 B2 | 7/2010 | Kwon et al. | |
| 2010/0178907 A1 | 7/2010 | Oroskar et al. | |

* cited by examiner

*Primary Examiner* — Frank Duong

(57) ABSTRACT

A method and system is disclosed for synchronization among access terminals of periodic computations of time-averaged measures of noise-indication messages received from the base station. An access terminal in a wireless communication system that includes a base station will set a reference time for synchronization with at least one other access terminal of periodic computations of time-averaged measures of noise-indication messages received from the base station. The access terminal will then synchronize a start time of periodic intervals for computing time-averaged measures of periodic noise-indication messages received from the base station with the reference time, and determine rates for transmission of data to the base station based at least on the time-averaged measures computed for the periodic intervals. The access terminal will the transmit data to the base station at the determined rates.

22 Claims, 8 Drawing Sheets

SYNCHRONIZED DETERMINATION OF RATE CONTROL AMONG USERS IN A WIRELESS COMMUNICATION SYSTEM

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector.

An access terminal may also engage in an active communication session simultaneously with multiple cells or sectors that are located geographically nearby one another, and which are all detected by the AT above one or another threshold signal strength. In this mode of operation, the AT is said to be in "soft handoff" with the multiple sectors, and may move among them seamlessly with respect to the active communication session. As the AT moves beyond the threshold range of one or another of its soft handoff sectors and into the range of one or more other sectors, usual handoff procedures are used to update the particular sectors with which the AT is in soft handoff.

In some wireless communication systems or markets, a wireless service provider may implement more than one type of air interface protocol. For example, a carrier may support one or another version of CDMA, such as EIA/TIA/IS-2000 Rel. 0, A (hereafter "IS-2000") for both circuit-cellular voice and data traffic, as well as a more exclusively packet-data-oriented protocol such as EIA/TIA/IS-856 Rel. 0 and Rev. A, or other version thereof (hereafter "IS-856" unless otherwise specified). Access terminals operating in such systems may be capable of communication with either or both protocols, and may further be capable of handing off between them, in addition to being able to hand off between various configurations of coverage areas.

OVERVIEW

An AT receives data from a base station on a "forward link" and sends data to the base station on a "reverse link." Data on either link are encoded by the sender and decoded by the receiver. The rate at which data can be transmitted on either link depends in part on the RF conditions of the respective link as well as the power level at which the data are transmitted. Better RF conditions and/or higher transmission power (e.g., higher signal-to-noise characteristics of a link) generally supports higher data rates, and vice versa. RF conditions may include factors such as noise and interference, while transmission power level is generally specified in accordance with one or more power-control procedures that are aimed at balancing the transmission power required to accommodate a given data rate with the impact of allocating the requisite power on one or another form of power budget and/or on RF interference.

In one of the power-control procedures used in IS-856 for managing reverse-link noise and load, the base station monitors the aggregate reverse-link noise and interference resulting from the combined transmissions of active ATs in a sector or cell (or other form of coverage area), and periodically broadcasts a noise-indication message that reflects the aggregate reverse-link noise level measured by the base station. More particularly, the base station sets the noise-indication message to a binary value (e.g., one or zero) according to whether or not the noise level measured by the base station exceeds a threshold noise level. Upon receiving the message, each AT with an active call or session in the sector may then respond by adjusting its reverse-link power. The manner in which an AT responds depends upon which of version of IS-856 the AT is operating under.

In particular, under IS-856, Rev. A, an AT with an active call or session in the sector periodically computes a time-averaged (or temporally-filtered) measure of the values in received noise-indication messages from the base station, and adjusts its reverse-link transmission power based in part on the time-averaged measures. The AT begins its periodic computations once service of an active call or session in a sector begins. Because the time-averaged measure at any instant depends in part on when the computations begin, and because there is generally no correlation among different ATs of when active service begins in a given sector, the periodic computations of different ATs at the same given instant can yield different time-averaged measures for the given sector. Consequently, different ATs with active calls or sessions in the same sector may respond differently to otherwise identical reverse-link loading conditions as reported to them by the sector. This may result in unfair discrepancies in reverse-link data rates achievable by the ATs. Accordingly it would be desirable to synchronize the periodic computations among ATs receiving service from the same cell or sector, and thereby achieve synchronization of determination of rate control among multiple ATs in a sector.

Hence in one respect, various embodiments of the present invention provide, in an access terminal operating in a wireless communication system that includes a base station, a method comprising: at the access terminal, setting a reference time for synchronization with at least one other access terminal of periodic computations of time-averaged measures of noise-indication messages received from the base station, wherein the noise-indication messages indicate noise measured by the base station on reverse links of an air interface, and the time-averaged measures are used for determining transmission rates of data to the base station; at the access terminal, synchronizing with the reference time a start time of periodic intervals for computing time-averaged measures of periodic noise-indication messages received from the base station, and determining rates for transmission of data to the base station based at least on the time-averaged measures computed for the periodic intervals; and at the access terminal, transmitting data to the base station at the determined rates.

In another respect, various embodiments of the present invention provide an access terminal configured to operate in a wireless communication system that includes a base station, the access terminal comprising: means for setting a reference time used for synchronization with at least one other access terminal of periodic computations of time-averaged measures of noise-indication messages received from the base station, wherein the noise-indication messages indicate noise measured by the base station on reverse links of an air interface, and the time-averaged measures are used for determining transmission rates of data to the base station; means for synchronizing with the reference time a start time of periodic intervals for computing time-averaged measures of periodic noise-indication messages received from the base station; means for determining rates for transmission of data to the base station based at least on the time-averaged measures computed for the periodic intervals; and means for transmitting data to the base station at the determined rates.

In still another respect, various embodiments of the present invention provide, in a base station configured to operate as part of a wireless communication system and further configured to serve a plurality of access terminals, including a first access terminal and a second access terminal, a method comprising: while serving the first access terminal but not the second access terminal in an active communication session, broadcasting from the base station periodic noise-indication messages that indicate noise measured by the base station on reverse links of an air interface; and thereafter, during initialization of a communication session of the second access terminal, transmitting from the base station a noise-history message to the second access terminal, the noise-history message containing information corresponding to an historical record of noise-indication messages broadcast by the base station prior to a reference time for synchronization among the plurality of access terminals of periodic computations of time-averaged measures of noise-indication messages broadcast by the base station.

In yet another respect, various embodiments of the present invention provide a base station configured to operate as part of a wireless communication system and further configured to serve a plurality of access terminals, the base station comprising: means for broadcasting periodic noise-indication messages that indicate noise measured by the base station on reverse links of an air interface, while serving the first access terminal in an active communication session; and means for, during initialization of a communication session of the second access terminal, transmitting a noise-history message to the second access terminal, wherein the noise-history message contains information corresponding to an historical record of noise-indication messages broadcast by the base station prior to a reference time for synchronization among the plurality of access terminals of periodic computations of time-averaged measures of noise-indication messages broadcast by the base station.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous variations are possible. For instance, structural elements and process steps can be rearranged, combined, distributed, eliminated, or otherwise changed, while remaining within the scope of the invention as claimed.

DETAILED DESCRIPTION

The present invention will be described by way of example with reference to Code Division Multiple Access ("CDMA") communications in general, and to IS-2000 and IS-856 communications in particular. As described below, IS-2000 applies to both circuit-cellular and packet-data communications, and is referred to herein simply as CDMA communications. IS-856 applies more exclusively to packet-data communications (including, e.g., real-time voice and data applications), and is referred to herein as "high rate" packet-data communications. Under IS-2000, packet-data communications are referred to as "1X-RTT" communications, also abbreviated as just "1X." However, since IS-2000 supports both circuit voice and packet data communications, the term 1X (or 1X-RTT) is sometimes used to more generally refer the IS-2000 air interface, without regard to the particular type of communication carried. Packet-data communications under IS-856 are conventionally referred to as "EVDO" communications, also abbreviated as just "DO." The terms EVDO, Rel. 0 and EVDO, Rev. A will be used herein to refer to IS-856, Rel. 0 and IS-856, Rev. A, respectively, and vice versa. Different versions of 1X-RTT may be similarly distinguished. Absent any specific version identification, EVDO will generally refer to any version of IS-856. It should be understood that the present invention can apply to other wireless voice and data protocols including, without limitation, IS-95 and GSM, which, together with IS-2000 and IS-856 are considered herein, individually or in any combination, to comprise a CDMA family of protocols.

Figure 1:
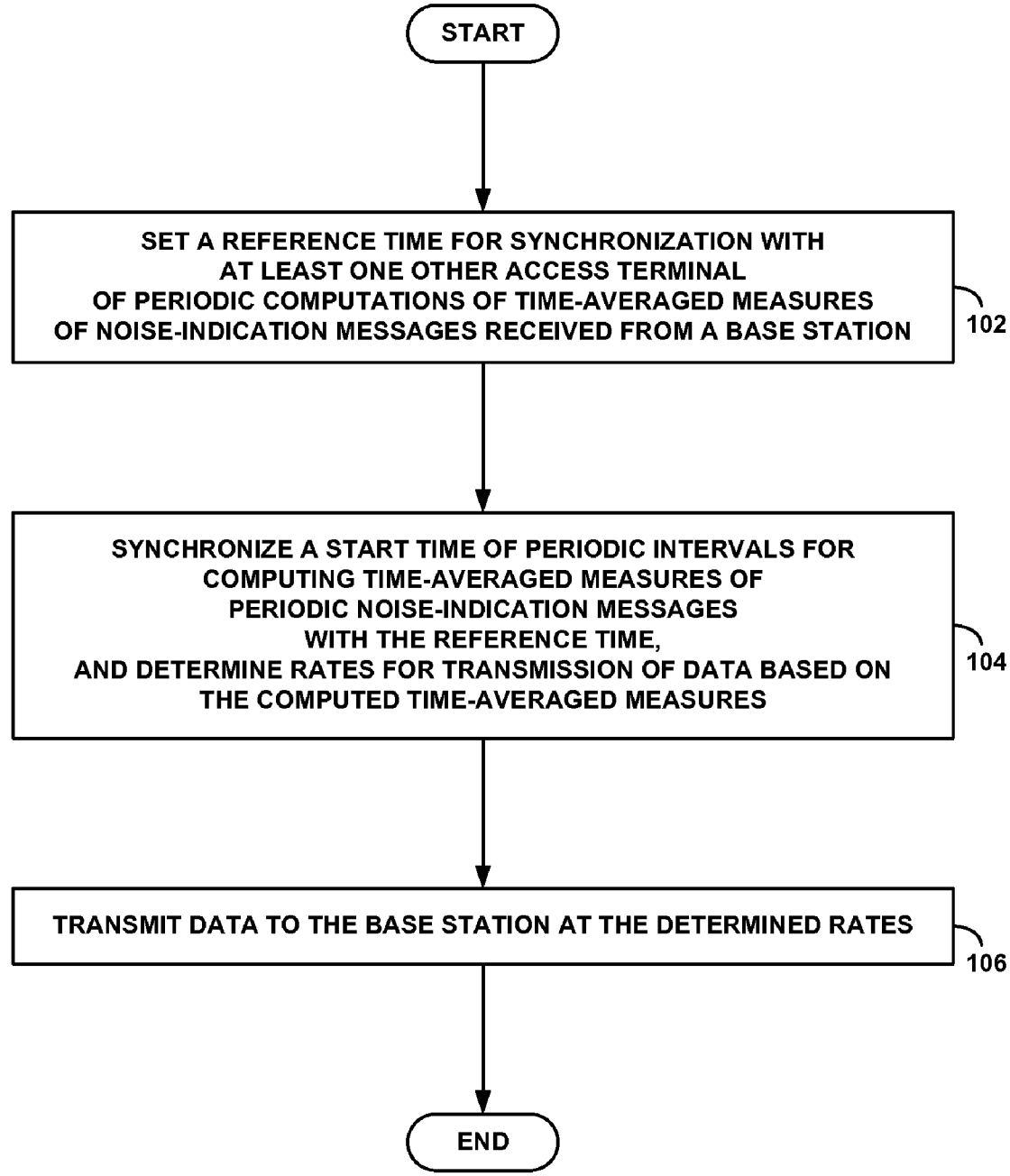
FIG. 1 is a flowchart illustrating an example embodiment of synchronized determination of rate control.

FIG. 1 is a flowchart illustrating an example embodiment of synchronized determination of rate control. By way of example, the steps of the flowchart could be implemented in an access terminal configured to operate according to a CDMA family of protocols, including IS-856, Rev. A, in a similarly-compliant wireless communication system that includes a base station (among other elements of a RAN). A base station typically comprises a BSC, a BTS, and a coverage area, such as a cell or a sector. The BSC may control more than one BTS, and the BTS may radiate (and receive) in more than one sector.

At step 102, the access terminal sets a reference time for synchronization with at least one other access terminal of periodic computations of time-averaged measures of noise-indication messages received from the base station. In accordance with the example embodiment, the noise-indication messages indicate noise and interference measured by the base station on reverse links of an air interface, and the time-averaged measures are used for determining transmission rates of data to the base station. Thus, the reference time is characterized as providing a basis for the access terminal to synchronize its computations of a particular quantity (i.e., the time-averaged measures) with at least one other access terminal. Correspondingly, setting the reference time is an action that enables the access terminal to achieve the synchronization. Further, the particular quantity (i.e., the time-averaged measures) is characterized by its use in determining reverse-link data rates by an access terminal.

At step 104, the access terminal synchronizes with the reference time periodic intervals for computing time-averaged measures of periodic noise-indication messages received from the base station, and determines rates for transmission of data to the base station based at least on the time-averaged measures computed for the periodic intervals. Thus, during each periodic interval, a time-average measure is computed, and the start time of at least the first periodic interval is synchronized with the reference time. The computed time averaged-measures are then used in determining rates for transmission of data from the access terminal to the base station on the access terminal's reverse link.

Finally, at step 106, the access terminal transmits data to the base station at the determined rates. In doing so, the access terminal advantageously is able to determine reverse-link data rates based on computed time-averaged measures of periodic noise-indication messages received from the base station that are the same as time-averaged measures computed by other access terminals being served at the same time by the same base station.

For an access terminal operating according to IS-856, Rev. A, in a sector (or cell or other form of coverage area) of a similarly-compliant RAN, the noise-indication messages each comprise a reverse activity bit (RAB) broadcast by the BTS of the sector on a forward-link Reverse Activity Channel. As such, the RAB would be set according to whether the aggregate reverse-link noise for the sector was above or below a threshold noise level. In further accordance with the example embodiment, the time-averaged measures would then be values of filtered RAB (FRAB) computed periodically by the access terminal. As described below, an AT uses FRAB for a given sector to adjust the rate at which it transmits data on it reverse link to the sector. Thus, the rate determination made at step 104 is based in part on the FRAB values computed during each interval.

Under IS-856, the AT's reverse link includes a pilot channel and a data traffic channel (among other channels). The AT's pilot channel carries a beacon (or pilot) signal that the base station uses for (among other purposes) maintaining a timing reference for decoding other reverse-link signals from the AT, and the AT's data traffic channel carries user data. The AT sets the pilot signal power level based on power-control commands received from the base station. According to IS-856, Rev. A, the AT's reverse-link data traffic channel power is set relative to the pilot channel power by a multiplicative factor referred to as "traffic-to-pilot" (abbreviated "T2P"). During an active data session, the AT periodically adjusts its data traffic channel power by periodically setting its T2P value. The AT sets its T2P value based, in part, on computed values of FRAB. Reverse power control according to IS-856, Rev. A is described in additional detail below.

In practice, the power level of both the pilot and data traffic channels are usually specified as a gain level, x, according to the relation x dBm=10 $\log_{10}$(P/1 mW), where P is the power in mW (milliwatts). As a relative level, T2P is then expressed in dB with respect to the pilot power. For example, T2P=+3 dB would correspond to a data traffic channel power twice that of the pilot channel, and T2P=+6 dB would correspond to a data traffic channel power four times that of the pilot channel. The total power of the reverse link pilot and data traffic channels would then be the sum of the powers of the individual channels. In terms of absolute power, a pilot power of 1 Watt and T2P=+3 dB would correspond to data traffic channel power of 2 Watts and a total power of 3 Watts. Similarly, if T2P=+6 dB, the total reverse link power of the pilot plus data traffic channels would be 5 Watts in this example.

Under IS-856, forward-link transmissions occur during time slots. In accordance with the example embodiment, the reference time (steps 102 and 104) specifies a periodically repeating time slot, and the periodic intervals could each be one or more time slots. Accordingly, synchronization of the periodic intervals for computing time-averaged measures with the reference time could comprise temporally aligning a first slot of each of the periodic intervals with the periodically repeating reference time slot. For example, the periodic intervals could be repeating frames of 16 time slots, and the reference time could be the first time slot of each frame. As another example, each interval could span multiple frames and the reference time could then align with the first slot of each interval.

As still another example, each interval could be just one time slot and the reference time could also be repeating time slots. In this case, synchronization could comprise setting a first time-averaged measure (such as FRAB) at an access terminal in a given sector to an initial value, such that subsequent computations at the access terminal yield values of the time-averaged measures that are the same as those of other active access terminals in the sector for the same time slots.

In further accordance with the example embodiment, synchronization of the periodic intervals for computing time-averaged measures with the reference time could comprise the access terminal receiving a noise-history message from the base station, and then determining the initial value of the time-averaged measure for an initial interval preceding the reference time. The noise-history message could contain information corresponding to an historical record of noise-indication messages transmitted by a sector prior to the reference time. For example, the noise-history message could contain one or more RAB values and/or one or more FRAB values for a number of time slots preceding the reference time. The access terminal could then determine an initial FRAB value to use in order to synchronize subsequent computations based on subsequently-received RABs from the sector.

As a further aspect of setting the reference time at step 102, the access terminal may receive the reference time in a message from the base station. As such, the access terminal could set the reference time according to a value supplied by the base station, and could update the reference time upon receiving a new or revised reference time from the base station.

In further accordance with the example embodiment, aspects of the method could be carried out by a base station. More particularly, the base station could maintain a history of RAB broadcasts, as well as a current FRAB value. During initialization of a communication session with an access terminal, the base station could then transmit a noise-history message to the access terminal, wherein the noise-history message could contain information corresponding to the historical RAB and FRAB values. In this way, the base station could advantageously enable all access terminals it is serving keep their FRAB computations synchronized with respect to like values at any common instant among the access terminals.

It will be appreciated that the steps of FIG. 1 are shown by way of example, and that additional and/or alternative steps or alternative ordering of steps could be carried out and still remain within the scope and spirit of the present invention.

Figure 2:
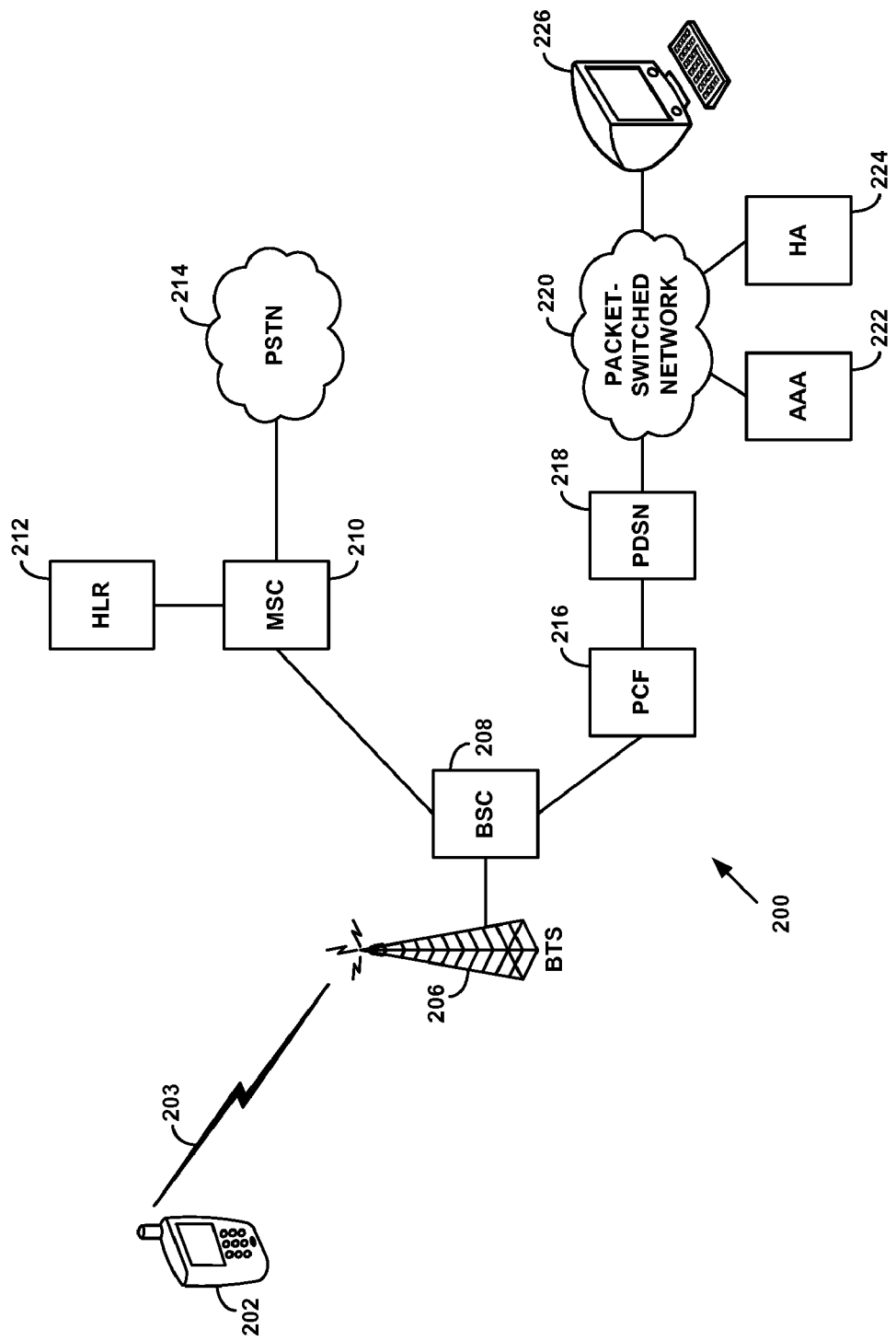
FIG. 2 is a simplified block diagram of a wireless communication system in which an example embodiment of synchronized determination of rate control can be employed.

FIG. 2 shows a simplified block diagram of a wireless communication system 200 in which an example embodiment of synchronized determination of rate control can be employed. Access terminal AT 202 communicates over an air interface 203 with a BTS 206, which is then coupled or integrated with a BSC 208. Transmissions over air interface 203 from BTS 206 to AT 202 represent the forward link to the access terminal (also referred to herein alternatively as the forward link from the base station, and as "the AT's forward link"). Transmissions over interface 203 from AT 202 to BTS 206 represent the "reverse link" (also referred to herein as "the AT's reverse link").

BSC 208 is connected to MSC 210, which acts to control assignment of air traffic channels (e.g., over air interface 203), and provides access to wireless circuit-switched services such as circuit-voice and circuit-data (e.g., modem-based packet data) service. As represented by its connection to PSTN 214, MSC 210 is also coupled with one or more other MSCs or other telephony circuit switches in the operator's (or in a different operator's) network, thereby supporting user mobility across MSC regions, and local and long-distance landline telephone services. Also connected to MSC 210 is home location register (HLR) 212, which supports mobility-related aspects of subscriber services, including dynamic tracking of subscriber registration location and verification of service privileges.

As shown, BSC 208 is also connected with a PDSN 218 by way of packet control function (PCF) 216. PDSN 218 in turn provides connectivity with a packet-switched network 220, such as the Internet and/or a wireless carrier's private core packet-network. Sitting as nodes on network 220 are, by way of example, an authentication, authorization, and accounting (AAA) server 222, a mobile-IP home agent (HA) 224, and a remote computer 226. After acquiring an air traffic channel over its air interface, an access terminal (e.g., AT 202) may send a request to PDSN 218 for a connection in the packet data network. Then, following authentication of the access terminal by AAA server 220, the access terminal may be assigned an IP address by the PDSN or by HA 224, and may thereafter engage in packet-data communications with entities such as remote computer 226.

It should be understood that the depiction of just one of each network element in FIG. 2 is illustrative, and there could be more than one of any of them, as well as other types of elements not shown. The particular arrangement shown in FIG. 2 should not be viewed as limiting with respect to the present invention. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network, and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as example access terminal 202 typically comprises a user-interface, I/O components, a communication interface, a tone detector, a processing unit, and data storage, all of which may be coupled together by a system bus or other mechanism. As such, system 200, AT 202, and air interface 203 collectively are representative of example means of implementing and carrying out the various functions, steps, and procedures described herein.

Throughout this description, the term "base station" will be used to refer to a Radio Access Network (RAN) element such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. Conventional CDMA Communications

In a conventional CDMA wireless network compliant with the well known IS-2000 standard, each cell employs one or more carrier frequencies, typically 1.25 MHz in bandwidth each, and each wireless service sector is distinguished from adjacent sectors by a pseudo-random number offset ("PN offset"). Further, each sector can concurrently communicate on multiple different channels, distinguished from each other by "Walsh codes." When an access terminal operates in a given sector, communications between the access terminal and the BTS of the sector are carried on a given frequency and are encoded by the sector's PN offset and a given Walsh code.

Air interface communications are divided into forward link communications, which are those passing from the base station to the access terminal, and reverse link communications, which are those passing from the access terminal to the base station. In an IS-2000 system, data are transmitted in units of frames on both the forward link and reverse link. On either link, communications in a given wireless service sector are encoded with the sector's PN offset and a given Walsh code.

On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

Concurrent communication in multiple forward-link channels on a common frequency in a sector is supported by allocating each channel a fraction of the total forward-link power available in the sector. The power allocated to each channel is determined so as to optimize the signal-to-noise characteristics of all the channels, and may vary with time according to the number of access terminals being serviced, and their relative positions with respect to the BTS, among other factors. Similarly, on the reverse links, each access terminal transmits at a power level that optimizes the signal-to-noise while minimizing interference with other access terminals.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other sectors, which may vary in as the AT moves about within the wireless communication system, or as other factors cause the AT's RF conditions to change. The AT reports the received signal strengths to the serving base station, which then directs the AT to update its active set in accordance with the reported strengths and one or more threshold conditions.

Operationally, an IS-2000 system is arranged to transmit the same data concurrently on a given carrier frequency in some or all of the sectors of a given AT's active set, encoding each transmission according to the PN offset of the respective sector and the Walsh code for the assigned channel therein. Correspondingly, the AT recognizes the concurrent transmissions according to the PN offsets of the sectors in its active set and the Walsh codes of its assigned channels. That is, operating under IS-2000, the AT will decode transmissions using all the PN offsets in its active set, together with the respective Walsh codes assigned for each PN-identified sector. The concurrent transmissions in sectors of the AT's active set provides an added level of reliability to communications, as well as possibly increased quality owing to improved signal to noise characteristics. The concurrency also facilitates soft handoff between sectors, as described above. A soft handoff between sectors the same BTS is referred to as a "softer handoff."

With the arrangement described above, an access terminal can engage in cellular voice and/or in packet-data communications. Referring again to FIG. 2, and taking an originating call from AT 202 as an example, AT 202 first sends an origination request over air interface 203 and via the BTS 206 and BSC 208 to MSC 210. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal). For a packet-data session (i.e., 1X-RTT), the BSC signals to the PDSN 218 by way of PCF 216. The PDSN 218 and access terminal 202 then negotiate to establish a data link layer connection, such as a point to point protocol (PPP) session. Further, the PDSN 218 sends a foreign agent advertisement that includes a challenge value to the access terminal, and the access terminal responds with a mobile-IP registration request (MIP RRQ), including a response to the challenge, which the PDSN forwards to HA 224. The HA then assigns an IP address for the access terminal to use, and the PDSN passes that IP address via the BSC to the access terminal.

2. High Rate Packet-Data Communications

Under IS-2000, the highest rate of packet-data communications theoretically available on a fundamental traffic channel of the forward link is 9.6 kbps, dependent in part on the power allocated to the forward-link traffic channel and the resultant signal-to-noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, each sector transmits to all its active ATs on a common forward link using time division multiplexing (TDM) in order to transmit to only one access terminal at a time, but at the full power of the sector. As a result of the full-power allocation by the sector, an access terminal operating under IS-856 can, in theory, receive packet-data at a rate of at least 38.4 kbps and up to 2.4 Mbps on its forward link.

TDM access on the IS-856 forward link is achieved by dividing the forward link in the time domain into time slots of length 2048 chips each. At a chip rate of 1.228 Mega-chips per second, each slot has a duration of 1.67 milliseconds (ms), or a rate of 600 time slots per second. Every 16 slots comprise a frame, corresponding to 26.67 ms per frame, and frame boundaries are synchronous across all sectors of a RAN.

Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst, for 256 MAC-channel chips per slot. The MAC channel is further subdivided into a Reverse Activity sub-channel, a "data rate control" (DRC) Lock sub-channel, an ARQ sub-channel, and a reverse power control (RPC) sub-channel. The remaining 1600 chips of each time slot (800 per half-slot) are allocated for a forward traffic channel or a forward control channel, so that any given time slot will carry either AT-specific traffic-channel data (if any exists) or AT-specific control-channel data. While the 1600 chips of forward-link traffic and/or control channel data of any given time slot are designated on a TDM basis to a specific access terminal, the MAC channel chips are encoded using different Walsh codes in order to broadcast different MAC sub-channels concurrently over the same MAC-channel chips and/or to transmit different AT-specific MAC-sub-channel data concurrently to different ATs on the same MAC-channel chips. As in IS-2000, each sector in IS-856 is defined by a PN offset, and the pilot channel carries an indication of the sector's PN offset.

The reverse link under IS-856 retains largely the traditional IS-2000 code division multiplexing (CDM) format, albeit with the addition of a "data rate control" (DRC) channel used to indicate the supportable data rate and best serving sector for the forward link. Multiple, active ATs in a common serving sector can transmit concurrently on their respective reverse links to the sector's BTS. Each reverse link comprises distinct code channels, thereby enabling the BTS to distinguish among each AT's transmissions. As with IS-2000, the IS-856 reverse link transmissions are frame-based.

The IS-856 reverse link includes an access channel and a traffic channel. The access channel is used by an AT that is not in a connected state (i.e., not in an active data session) to signal to the RAN in order to establish a data session. The traffic channel is used by an AT in a connected state to transmit data, as well as signaling and control information, to the RAN. Both the access and traffic channels include the pilot signal that serves as beacon signal for identifying the AT to the RAN and for establishing and maintaining a timing reference for decoding other signals received at the RAN from the AT. Packet-data rates achievable on the reverse-link traffic channel depend on the version of IS-856; under Rel. 0, an AT can achieve a maximum reverse-link burst rate of 153.6 kilobits per second (kbps), while under Rev. A, an AT achieve a maximum reverse-link burst rate of 1.8 Megabits per second (Mbps).

Power control of the reverse link under IS-856 employs one or more feedback procedures by which an AT adjusts its reverse-link power and data rates in response to commands from the AT's serving sector that are aimed both at maintaining a particular AT-specific reverse-link error rate within an AT-specific threshold error rate, and at maintaining an aggregate reverse-link noise level below a threshold noise level. Regarding aggregate reverse-link noise and load, each sector periodically broadcasts a RAB on its Reverse Activity subchannel, wherein the value of the RAB depends on the aggregate reverse-link noise measured by sector. An AT responds to each RAB received from each of its active-set sectors by adjusting the transmission power and/or transmission rates of its reverse data channel according to procedures compliant with one or another of Rel. 0 and Rev. A versions of IS-856. In particular, the AT adjusts its data channel transmission power and transmission rate relative to its pilot power level based on the RAB received from the sector and on the particular protocol version.

More specifically, the sector continually measures an aggregate of reverse link transmission power and every 1.67 ms (i.e., every time slot) computes a noise metric referred to as reverse noise rise (RNR). RNR is the difference between (i) the reverse noise that the access node is currently detecting and (ii) a baseline level of reverse noise. Thus, the sector computes how far the reverse noise has risen above that baseline. When the computed RNR exceeds a threshold RNR value, the sector sets the RAB to one; when the computed RNR does not exceed the threshold RNR value, the sector sets the RAB to zero. The RNR threshold is a configurable system parameter that can range from 0 dB to 30 dB. Hence, a RAB set to one corresponds to higher reverse-link noise (and less favorable RF conditions), while a RAB set to zero corresponds to lower reverse-link noise (and more favorable RF conditions).

The sector periodically broadcasts the RAB to served access terminals on its Reverse Activity sub-channel at a rate typically in multiples of once per frame, up to a maximum of 16 times per frame, corresponding to once per time slot. Each RAB value is broadcast over an integer number of consecutive time slots of a frame, after which a new RAB (possibly with the same value as the previous RAB) is broadcast over the same integer number of slots. The integer number is set in a parameter conventionally referred to as "RABlength." An AT with an active EVDO data session will, in turn, adjust its data channel power level and transmission rate according to the RABs received over each RABlength number of time slots.

Under IS-856, Rel. 0, an AT can transmit on its reverse link at one of five rates: 9.6 kbps, 19.2 kbps, 38.4 kbps, 76.8 kbps, and 153.6 kbps. The consecutive order of the listed rates defines the order in which the AT may transition between rates. At the start of a data session, the AT transmits at 9.6 kbps, then over the course of the session transitions among the other rates based on received RABs and a transition probability integer for each transition. Specifically, the AT will transition up or down from its current rate to the next consecutive higher or lower rate depending on the value (one or zero) of the RAB and based on a probabilistic test that controls whether or not to make the transition. For a RAB set to one, the AT will transition from its current rate to the next lower rate with a probability determined by the outcome of a test for the particular downward transition. Conversely, for a RAB set to zero, the AT will transition from its current rate to the next higher rate with a probability determined by the outcome of a test for the particular upward transition. When the RAB of any one of the AT's active-set sectors is one, the AT treats the RAB of all of its active-set sectors as being set to one.

Each probability test is a uniform random selection of an integer between 0 and 255. If the selected integer is smaller than a transition probability integer (also in the range between 0 and 255) for the particular current-to-new rate pair, the AT transitions up or down to the next rate. If the selected integer is not smaller than the transition probability integer, the AT remains at its current rate. The AT then sets its reverse-link data channel transmission power to accommodate the selected rate. If a given increased data rate requires a higher transmission power than the AT is allowed at a particular time, the AT will not make the upward transition.

Under IS-856, Rev. A, an AT computes a short-term and a long-term historical indicator of RAB values reported by the base station in order to adjust a flow-control mechanism on its reverse-link. Both indicators are computed as mathematical digital filters, but differ in the time ranges over which the filters are applied. The short-term filter, referred to as "Quick" RAB (QRAB), gives a snapshot of the current state of the RAB, while the long-term filter, FRAB (discussed briefly above), yields a time-averaged value of RABs received over a much longer time interval that precedes the moment at which FRAB is computed. In practice, each RAB broadcast is modulated by the sector to a value of either −1 for RAB=0 or +1 for RAB=1. Correspondingly, the AT computes the QRAB as either −1 or +1, and computes FRAB as a real number in the range [−1, 1]. The AT uses both QRAB and FRAB to adjust its reverse-link data channel transmission power according to a ratio of reverse traffic channel power to reverse pilot channel power, i.e., the AT adjusts T2P.

Briefly, Rev. A reverse power control treats T2P like a resource, and invokes a mechanism for resource allocation and management that is sometimes referred as a "token bucket." An amount "BucketLevel" of T2P resource in the bucket at any time is a function of an amount "T2PInflow" of T2P resource the AT adds to the bucket added to the bucket and an amount "T2POutflow" the AT removes from the bucket during data transmission. The AT periodically determines whether to increase or decrease T2PInflow according to whether the current value of QRAB is −1 or +1, respectively. The amount of increase (when QRAB=−1) is then determined based in part on the current value of FRAB, wherein the smaller the value of FRAB the larger the increase, and vice versa. Other factors, such as forward-link pilot strength, are used in determining the increase as well.

From the T2P inflow and current BucketLevel, the AT determines an amount of T2P resource that can be used at a given time during a transmission. The AT then sets a packet size and a transmission power level based on the amount of T2P resource that can be used. Note that this amount can sometimes momentarily exceed the inflow rate, and thereby occasionally accommodate high rate data bursts. Also, since the frame size is generally fixed, packet size corresponds to a data density and therefore a data rate; i.e., a larger packet size corresponds to a higher data rate, and vice versa. Under IS-856, Rev. A, effective reverse-link data rates can range from 19.2 kbps up to 1.84 megabits per second (Mbps).

Operation in an IS-856 compliant communication system may be illustrated, again with reference to FIG. 2. To acquire packet data connectivity under IS-856, after an access terminal first detects an EVDO carrier, the access terminal sends to its BSC (or RNC) 208 a UATI (Universal Access Terminal Identifier) request, and receives in response an UATI, which the access terminal can then use to identify itself in subsequent communications with the BSC. The access terminal then sends a connection-request to the BSC 208, and the BSC responsively invokes a process to authenticate the access terminal and to have the access terminal acquire a data link.

In particular, the BSC 208 sends an access request to an Access Network AAA (ANAAA) server (which may be different than the AAA server 222), and the ANAAA server authenticates the access terminal. The BSC 208 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC signals to the PDSN 218 (via PCF 216), and the PDSN and access terminal then negotiate to establish a PPP data link. In addition, as in the IS-2000 process, the access terminal then sends an MIP RRQ to the PDSN, which the PDSN forwards to the HA 224, and the HA assigns a mobile-IP address for the access terminal to use.

3. Synchronized Determination of Rate Control a. Operating Principles

Under IS-856, the reverse power-control procedures are based on one form or another of RAB monitoring by the AT. Since the RAB is an indicator of aggregate reverse-link noise (i.e., RNR), the reverse power-control procedures can be understood as helping to balance the reverse power and data rates achievable by the AT with the AT's contribution to the aggregate reverse-link noise and overall load from all ATs served by a given sector. In other words, reverse power-control procedures comprise a feedback mechanism, with the RAB acting as a feedback variable.

As described above, a sector determines the value for each RAB broadcast by comparing RNR to a threshold value. For each threshold comparison, the sector broadcasts a RAB value (0 or 1, modulated to −1 or +1) over RABlength consecutive time slots. For example, for RABlength=4, the sector would broadcast a given RAB over four time slots, and would generate four distinct RAB broadcasts per 16-slot frame (each RAB being independently determined as 0 or 1).

Under IS-856, Rev. A, an access terminal periodically determines FRAB for a sector by applying a digital filter to the RAB values received from the sector. The digital filter is characterized by a time constant that defines an interval over which RAB values are mathematically filtered, and the periodicity of the filtering computation yields FRAB as a form of running time-averaged trend of RAB values. The value of FRAB from any computation depends on the time constant and on time at which the computation is carried out. In turn, the time at which a computation of FRAB is carried out depends on the periodicity of the computations (i.e., the time between successive computations) and the time of an initial computation (i.e., the first computation of a sequence of successive computations).

An access terminal only computes FRAB while it is engaged in an active communication session. More specifically, an AT begins to monitor RAB broadcasts from a given sector, and to compute corresponding FRAB values for the sector, only once the AT establishes a communication session via the sector or when the AT adds the sector to its active set during an existing communication session. During an active EVDO session, the AT receives forward-link data from only one serving sector at a time, but transmits on its reverse links to all of the sectors in its active set. Accordingly, the AT monitors the RAB broadcasts from each of its active-set sectors, and responds in a manner that tends to favor accommodating the sector in its active set that has the highest load (as indicated by its RAB broadcasts). Under IS-856, Rev. A, the access terminal will take QRAB=+1 (and therefore will not increase T2PInflow) for any computation for which QRAB=+1 for at least one of its active set sectors. Further, when computing a new value of FRAB, the access terminal will take RAB=+1 for the current value if at least one of its active-set sectors broadcast RAB=+1.

Because there is generally no correlation among different ATs of when active service begins in a given sector or when a given sector becomes concurrently active, conventionally-arranged periodic computations of FRAB carried out by the different ATs served concurrently by the same sector can yield different values at any given instant. Consequently, all other factors being equal, different ATs may adjust their reverse-link data rates differently in response to otherwise identical reverse-link noise and loading conditions in a sector.

Figure 3:
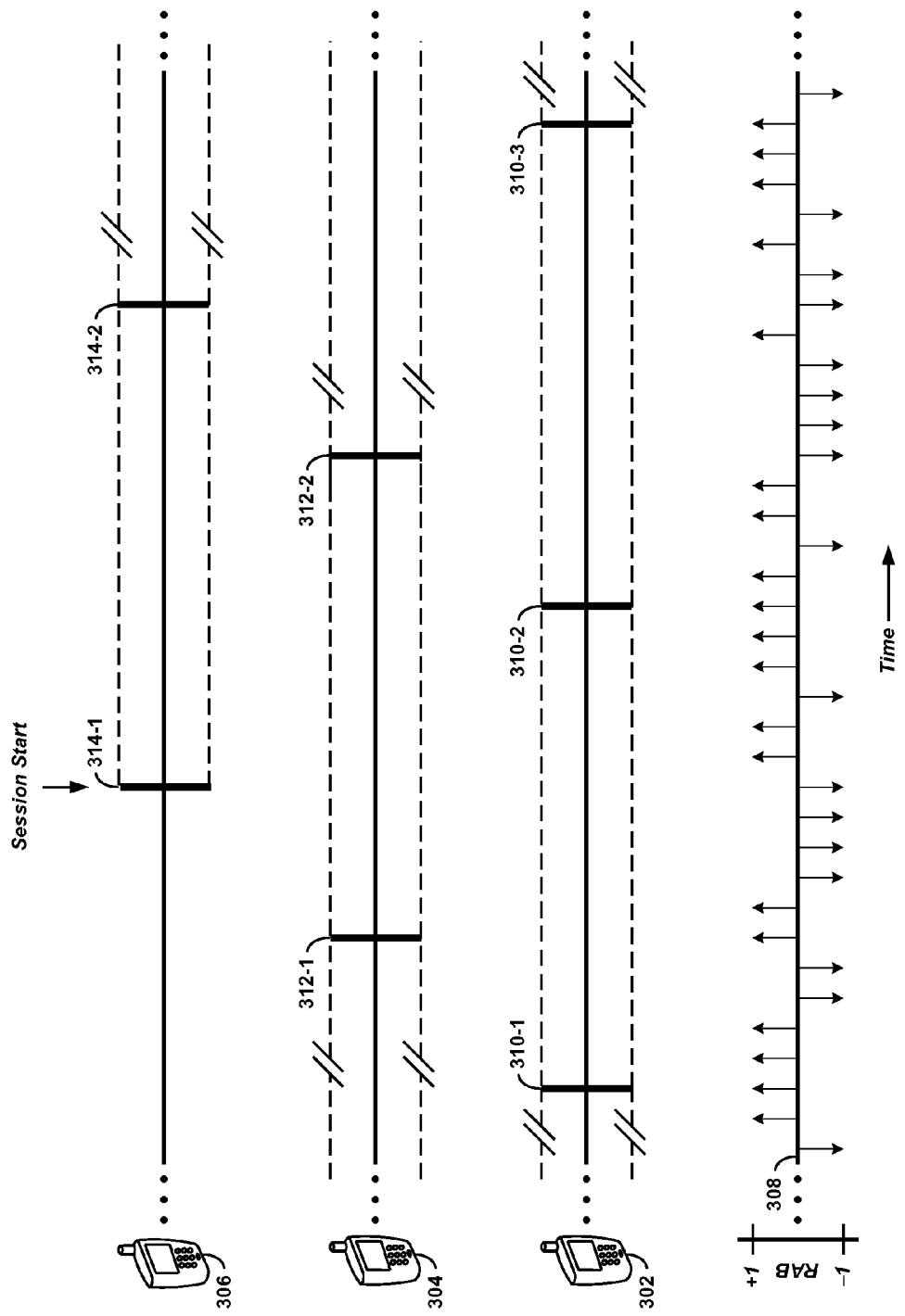
FIG. 3 illustrates the concept of asynchronous determination of rate control among three example users in a wireless communication system.

Conventional, asynchronous computation of FRAB is illustrated conceptually in FIG. 3, which shows FRAB computation periods for three different ATs 302, 304, and 306 monitoring the same RAB broadcasts in a common sector. In the figure, the RAB broadcasts are shown on a timeline 308 as upward arrows, representing RAB=+1, or downward arrows, representing RAB=−1 (RAB=0 prior to modulation). The particular sequence of RAB values (upward and downward arrows) is arbitrary in the example of FIG. 3, serving only for the purpose of illustration. By way of example the frequency of RAB broadcasts is once per time slot (e.g., RABlength=1). Also by way of example, the period for computing FRAB is taken to be one 16-slot frame (i.e., FRAB is computed once per frame), as indicated by the thick vertical lines marking computation times (every 16 slots) and the dashed horizontal lines delineating the intervals between computations. It will be appreciated that other values of RABlength and computation period could be used. The filter time constant is not indicated in the figure. A typical value is on the order 384 time slots, although other values could be used. In any case, the time constant need not correspond to the computation period (although this in not precluded).

In the figure, AT 302 is engaged in an ongoing communication session, as indicated by the ellipses near the left side of the timeline for AT 302. At time 310-1, AT 302 computes an updated value of FRAB, based at least on RAB values received since the previous computation. Note that depending on the filter time constant, the computation of the filtered value may also depend on RAB values received earlier than the immediately previous computation interval. That is, the time constant will generally account for earlier RAB values.

One frame later, at time 310-2, AT 302 computes the next updated value of FRAB, based at least on RAB values received since the computation at time 310-1. Then at time 310-3, AT 302 computes the next updated value of FRAB, this time based at least on RAB values received since the computation at time 310-2. The process continues, as indicated by the ellipses at the right side of the timeline for AT 302 and the hatch marks representing the continuation of the next computation interval.

A similar description applies to AT 304, except that the computation times 312-1 and 312-2 are not aligned with any of the computation times for AT 302. In this case, AT 304 will base its FRAB computation on a different sub-sequence (16 slots) of RAB values, and thereby possibly derive a different FRAB value, even though AT 304 and AT 302 are both receiving the same RAB broadcasts.

Finally, AT 306 is shown as just starting a communication session the sector at time 314-1, and then computing an updated FRAB value at time 314-2. As with AT 302 and AT 304, AT 306 will derive a possibly different FRAB value, even though it is receiving the same RAB broadcasts as the other two ATs.

As FIG. 3 illustrates, the three ATs will tend to compute different values of FRAB while operating conventionally in the same sector at the same time. Consequently, each AT will apply different values of FRAB to their respective T2P adjustments while operating conventionally in the same sector at the same time. The variations in the values of FRAB among the different ATs will depend, among other factors, on the mathematical form of the filter applied to the RAB values, the time constant for the filter, the period of the computation interval, and the differences between the computation times of the ATs. In any case, the variations can result in different reverse-link data rate among the ATs, even when all other conditions are the same.

b. Synchronization of Computations

Figure 4:
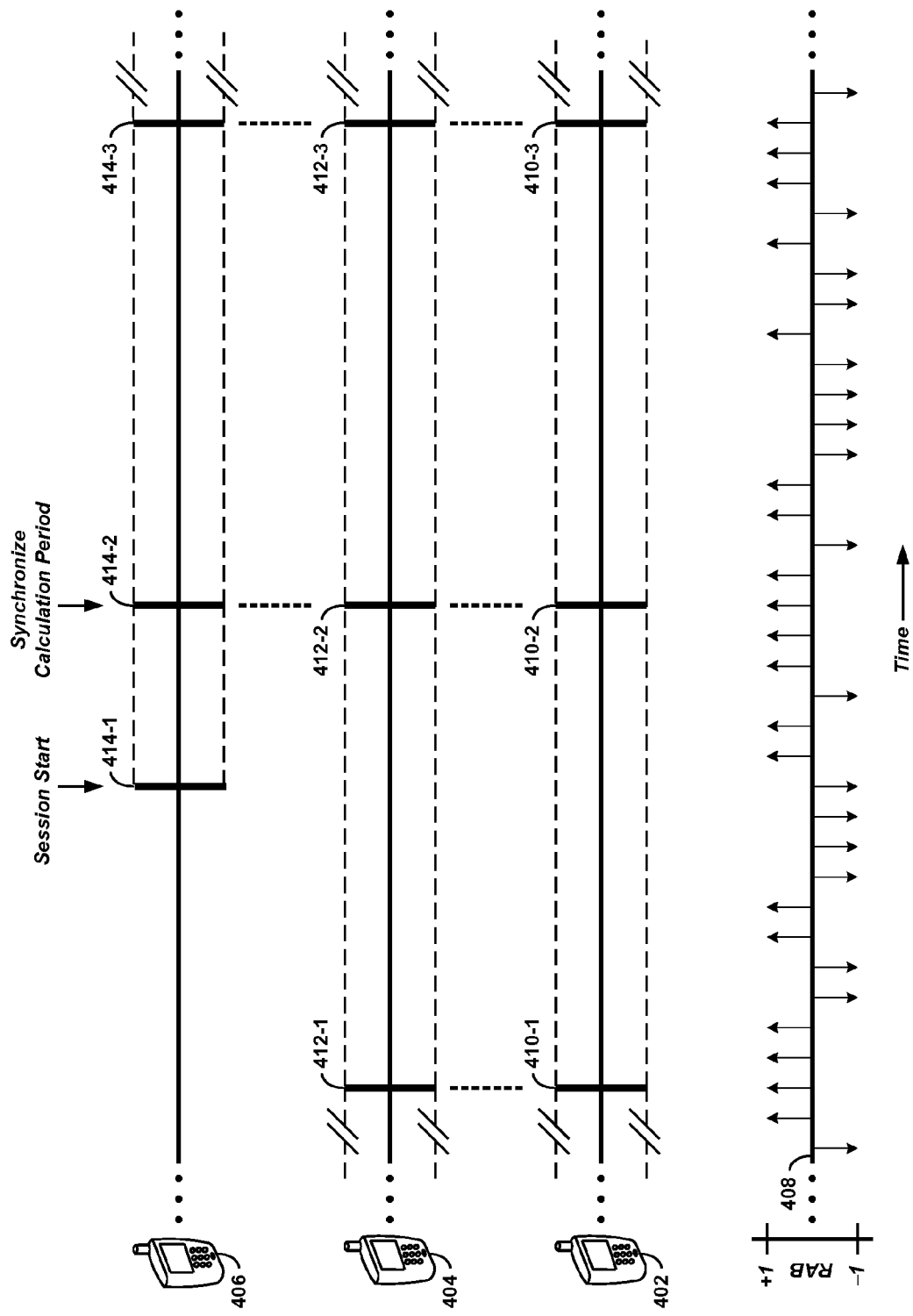
FIG. 4 illustrates an embodiment of synchronous determination of rate control among three example users in a wireless communication system.

In order to eliminate the discrepancies in FRAB computations among access terminals operating concurrently in the same sector, an example embodiment of the present invention provides synchronization of computations in a manner resulting in like FRAB values at like times among AT operating in a common sector. Operation according to an example embodiment is illustrated conceptually in FIG. 4, which shows FRAB computation periods for three different ATs 402, 404, and 406 monitoring the same RAB broadcasts in a common sector. Except for beginning with a "4" instead of a "3," each item label in FIG. 4 corresponds to a like item label in FIG. 3 and identifies an identical AT or a like conceptual element (e.g., timeline, computation time, etc.).

In the figure, AT 402 is engaged in an ongoing communication session. At times 410-1, 410-2, and 410-3, AT 402 computes updated values of FRAB, based at least on RAB values received in the intervals preceding the computation times. The process continues, as indicated by the ellipses at the right side of the timeline for AT 402 and the hatch marks representing the continuation of the next computation interval.

The same description applies to AT 404, which carries out computations at times 412-1, 412-2, and 412-3 that, unlike in conventional operation, are synchronous by design with the computations of AT 402. In this case, AT 404 will base its FRAB computations on the same sub-sequences of RAB values as AT 402, and will thereby advantageously derive the same FRAB values for the same RAB broadcasts.

Finally, AT 406 is shown as just starting a communication session the sector at time 414-1, and then computing an updated FRAB value at times 414-2 and 414-3. The start of the communication session at time 414-1 occurs at an arbitrary time slot with respect to the synchronized computation times of ATs 402 and 404. However, in accordance with the example embodiment, the AT 406 sets time 414-2 to coincide with the next, upcoming, synchronized computation time of the other two access terminals. In the present example, that time is 410-2 for AT 402 and 414-2 for AT 404. Subsequent computations for AT 406 are now advantageously synchronized with those of the other two ATs. Consequently, AT 406 will advantageously derive the same FRAB values for the same RAB broadcasts, once it synchronizes its computations with the other access terminals. Although it is not explicitly shown in FIG. 4, it may be surmised that ATs 402 and 404 synchronized their computations in a similar manner.

Synchronization may be achieved by providing an access terminal with a reference time for synchronization, as well as information indicative of historical RAB broadcasts from the sector that enables the access terminal to synchronize not only its computation periods, but also its initial FRAB value. In accordance with the example embodiment, the reference time will correspond to a periodically-repeating time slot. For example, the reference time could be the first time slot of each forward-link frame or of every Nth frame, where N is a positive integer. As an alternative, the reference time could be the first time slot of every RABlength time slots. In this case, the reference time could correspond to the first time slot of each new RAB broadcast.

In further accordance with the example embodiment, the reference time could be provided to the access terminal in a message transmitted from the sector. Alternatively, the reference time could be pre-configured in the access terminal, or provided by another source.

The information indicative of historical RAB broadcasts from the sector could take on various forms, depending in part on the nature of the filter applied to derive FRAB. For example, for a simple time average of RAB values over an interval between computations, the information could simple comprise a list of historical RAB values from the time that FRAB computations begin until the first occurrence of the reference time. Referring again to FIG. 4, this would correspond to the RAB values broadcast in the interval from 414-1 to 414-2.

As another example, a filter could be represented as a recursive function of FRAB values, in which each new FRAB value is computed in terms of the most recent RAB value and the previous N FRAB values (where N is a positive integer). In this case, the RAB history would be implicitly contained in the previous N FRAB values, and only the most recent RAB value would be explicitly input to the computation. Other examples are possible as well.

In accordance with the example embodiment, both the reference time and the information indicative of historical RAB broadcasts from the sector will be provided to the access terminal by the sector during initialization of a new communication session in the sector. As discussed above, such an initialization could correspond to establishment of a new EVDO session with the access terminal or to inclusion of the sector in the access terminal's active set during an existing communication session. In either case, the sector will provides the reference time and the historical information in one or more messages to the access terminal.

In further accordance with the example embodiment, the sector (or relevant RAN element) will maintain the historical RAB and FRAB information on a continuous basis so that the information can be provided to any access terminal as needed in the manner described above. Once an access terminal receives reference time and the information indicative of historical RAB broadcasts from the sector, it can determine an appropriate initial FRAB value, and thereafter synchronize its computations of FRAB with other access terminals already engaged in active sessions in the sector.

4. Implementation of Example Embodiment

As described above, the example embodiment involves actions and operations carried out by both the access terminal and the base station (or sector). As such, the example embodiment may be considered as comprising a "client-side," associated with the access terminal (or other client communication device), and a "system-side," associated with the base station (or sector). The example embodiment can be implemented as executable steps and operations of a client-side method carried out by an access terminal, and as executable steps and operations of a system-side method carried out by a base station (or BTS cell or sector).

Implementation of the example embodiment can further be considered as including means for carrying out both the client-side method and the system-side method. An example implementation of both the client-side method and means and the system-side method and means is described below. By way of example, both the access terminal and the base station are taken to be configured to operate according to IS-856, Rev. A, in a similarly-compliant wireless communication system, such as the one described above in connection with FIG. 2.

a. Example Method Implementation in an Access Terminal

Figure 5:
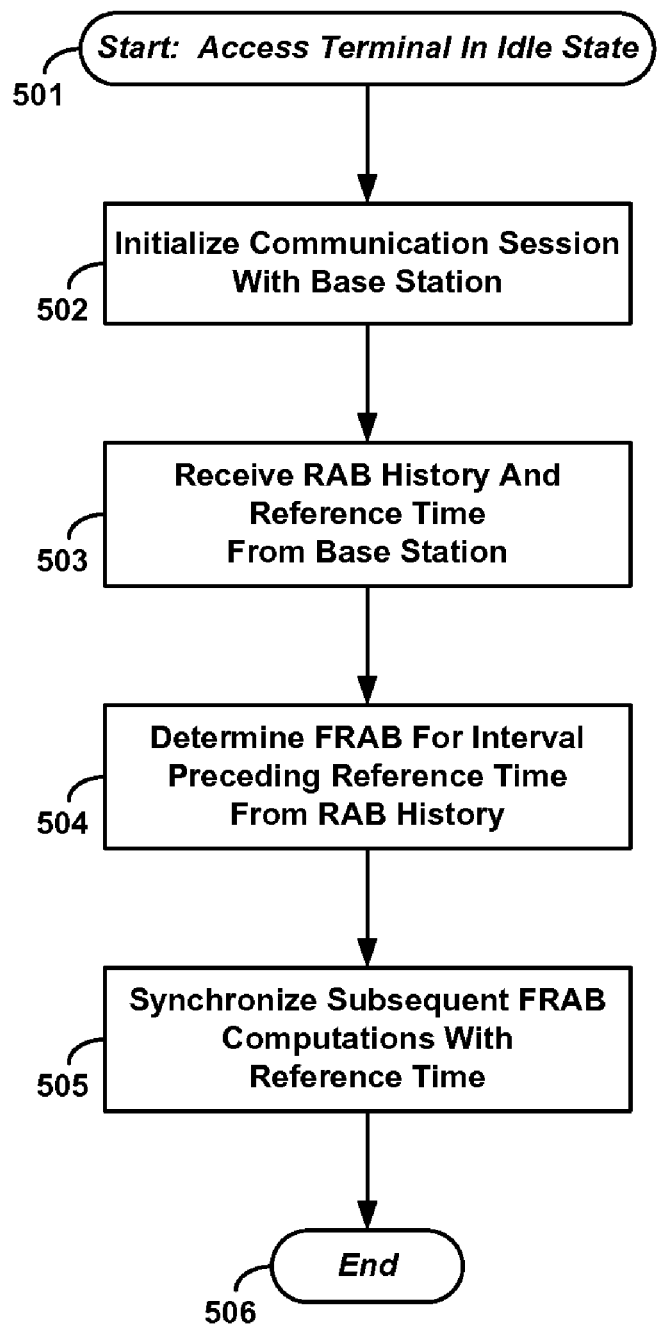
FIG. 5 illustrates an example embodiment of logical steps for implementing in an access terminal a method of synchronized determination of rate control.

FIG. 5 is a logical flowchart representing executable steps and operations that could be carried out by an access terminal to implement an example client-side method of synchronized determination of rate control. The illustrated steps could be implemented in an AT (or similar device) as executable instructions stored in the memory of the AT and executed by one or more processors of the AT.

By way of example, the AT is taken to be initially in an idle state; i.e., it is not engaged in an active EVDO session. This is indicated at the start step 501. At step 502, the AT initializes an EVDO communication session with a serving sector (reference and a "base station" in the figure). Initialization is taken to include conventional operational procedures for setting up an EVDO session, such as issuing an access request to the sector, receiving a channel assignment message, etc. As an alternative, the AT could already be engaged in an active EVDO session at step 501, in which case the method would apply to the process of adding the sector to the AT's active set.

At step 503, the AT receives a message containing information indicative of historical RAB broadcasts from the sector and a reference time from the sector. The message could comprise an existing CDMA system message (e.g., a system parameters message), or could comprise a new message type. The information indicative of historical RAB broadcasts from the sector could comprise a list of historical RAB values broadcast by the sector and/or one or more FRAB values derived or derivable from the historical RAB values.

At step 504, the AT determines an initial FRAB value for the time interval preceding the reference time. Referring again to FIG. 4, this could correspond to the RAB values broadcast in the interval from 414-1 to 414-2 (where time 414-2 corresponds to the reference time) and/or an FRAB value for the interval preceding the reference time.

Finally, at step 505, the AT synchronizes is computations of FRAB with the reference time, and thereby with other access terminals with concurrent active EVDO session in the sector. Step 506 marks the end of the synchronization procedure. It may be assumed that the EVDO session initiated at step 502 is now active. Advantageously, the AT will have synchronized its FRAB computations by this point.

It will be appreciated that the steps shown in FIG. 5 are meant to illustrate operation of an example embodiment. As such, various steps could be altered or modified, the ordering of certain steps could be changed, and additional steps could be added, while still achieving the overall desired operation.

b. Example Method Implementation in a Base Station

Figure 6:
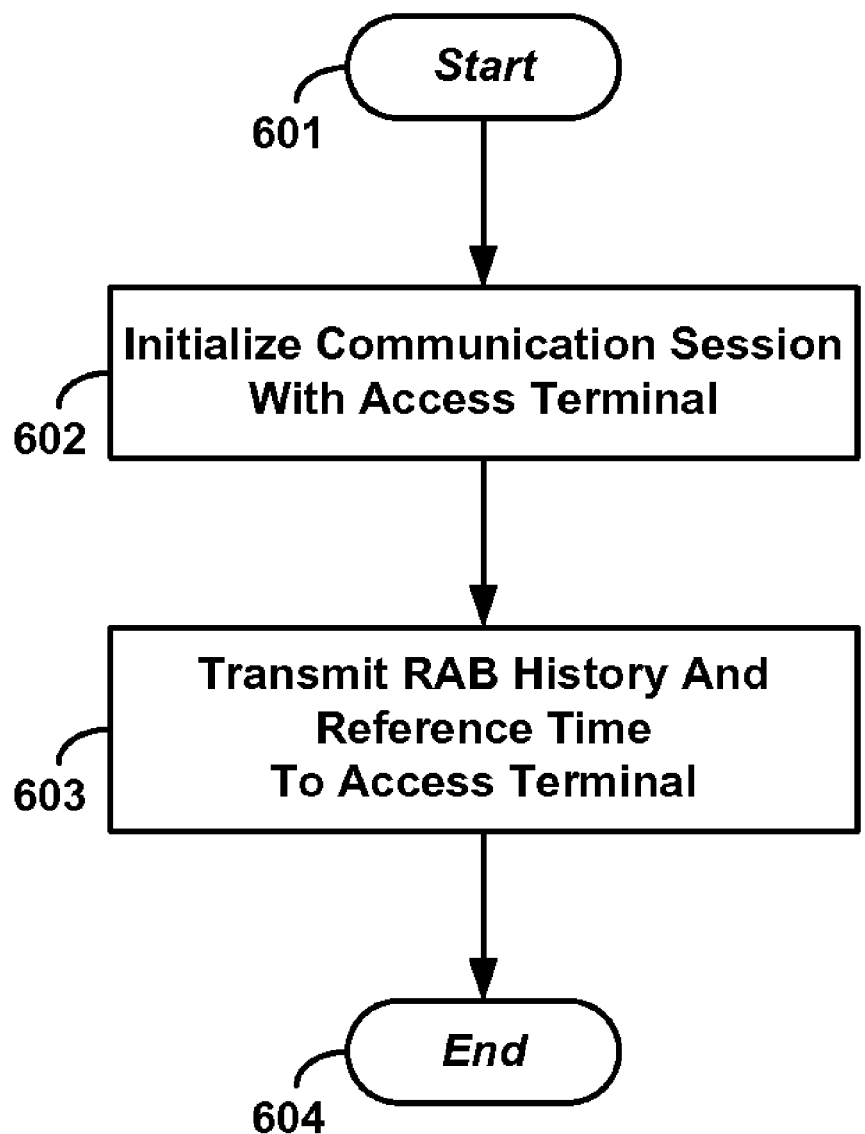
FIG. 6 illustrates an example embodiment of logical steps for implementing in a base station a method of synchronized determination of rate control.

FIG. 6 is a logical flowchart representing executable steps and operations that could be carried out by base station to implement an example system-side method of synchronized determination of rate control. The illustrated steps could be implemented in a base station, BTS (or other RAN element) as executable instructions stored in the memory of the base station and executed by one or more processors of the base station.

At the start 601, the sector (reference and a "base station" in the figure) is not yet providing access to an AT. At step 602, the sector initializes an EVDO communication session with an access terminal. Initialization is taken to include conventional operational procedures for setting up an EVDO session, such as receiving an access request from the AT, issuing a channel assignment message, etc. As an alternative, the AT could already be engaged in an active EVDO session at step 601, in which case the method would apply to the process of adding the sector to the AT's active set.

At step 603, the sector transmits a message containing information indicative of historical RAB broadcasts from the sector and a reference time from the sector. The message could comprise an existing CDMA system message (e.g., a system parameters message), or could comprise a new message type. The information indicative of historical RAB broadcasts from the sector could comprise a list of historical RAB values broadcast by the sector and/or one or more FRAB values derived or derivable from the historical RAB values. In accordance with the example embodiment, the sector would maintain the historical information in its memory (e.g., disk, solid state, etc.).

Step 604 then marks the end of the synchronization procedure as carried out by the sector.

It will be appreciated that the steps shown in FIG. 6 are meant to illustrate operation of an example embodiment. As such, various steps could be altered or modified, the ordering of certain steps could be changed, and additional steps could be added, while still achieving the overall desired operation.

c. Example Access Terminal

Figure 7:
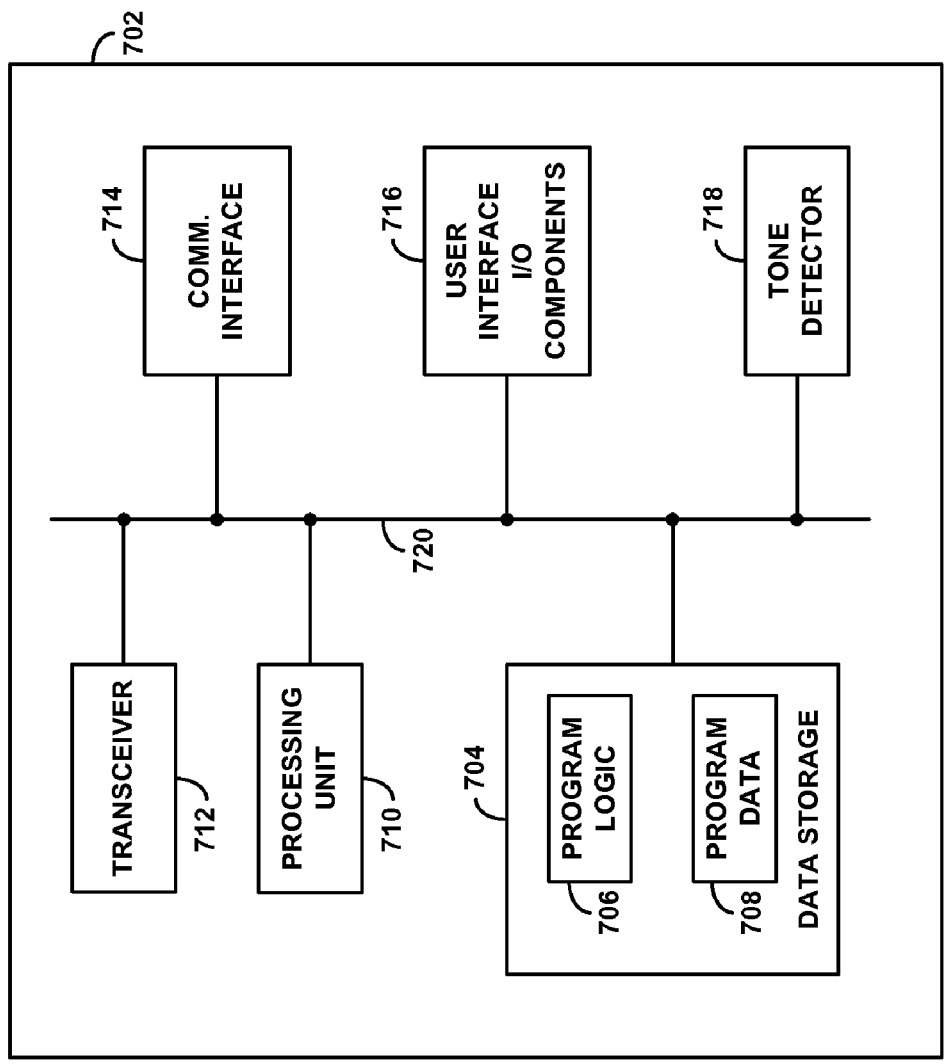
FIG. 7 is a block diagram of an example access terminal in which synchronized determination of rate control may be implemented.

FIG. 7 is a simplified block diagram depicting functional components of an example access terminal 702 in which client-side operation of synchronized determination of rate control may be implemented. The example AT 702 could be a cell phone, a personal digital assistant (PDA), a pager, a wired or wirelessly-equipped notebook computer, or any other sort of device. As shown in FIG. 7, the example AT 702 includes data storage 704, processing unit 710, transceiver 712, communication interface 714, user-interface I/O components 716, and tone detector 718, all of which may be coupled together by a system bus 720 or other mechanism.

These components may be arranged to support conventional operation in a wireless communication network that is compliant with a CDMA family of protocols, such as network 200 illustrated in FIG. 2. The details of such an arrangement and how these components function to provide conventional operation are well-known in the art, and are not described further herein. Certain aspects of AT 702 relevant to synchronized determination of rate control are discussed briefly below.

Communication interface 714 in combination with transceiver 712, which may include one or more antennas, enables communication with the network, including reception of noise-indication messages (e.g., RAB broadcasts) from the serving base station and transmission of one or more messages containing a reference time and information indicative of historical noise-indication messages broadcast from the sector, as well as support for other forward and reverse link channels. The communication interface may include a module, such as an MSM™-series chipset made by Qualcomm Inc. of San Diego, Calif., and supports wireless packet-data communications according to a CDMA family of protocols.

Processing unit 710 comprises one or more general-purpose processors (e.g., INTEL microprocessors) and/or one or more special-purpose processors (e.g., dedicated digital signal processor, application specific integrated circuit, etc.). In turn, the data storage 704 comprises one or more volatile and/or non-volatile storage components, such as magnetic or optical memory or disk storage. Data storage 704 can be integrated in whole or in part with processing unit 710, as cache memory or registers for instance. In example AT 702, as shown, data storage 704 is configured to hold both program logic 706 and program data 708.

Program logic 706 may comprise machine language instructions that define routines executable by processing unit 710 to carry out various functions described herein. In particular the program logic, communication interface, and transceiver may operate cooperatively to carry out logical operation such as that discussed above and illustrated in FIG. 5.

It will be appreciated that there can be numerous specific implementations of an access terminal, such as AT 702, in which the client-side method of synchronized determination of rate control could be implemented. Further, one of skill in the art would understand how to devise and build such an implementation. As such, AT 702 is representative of means for carrying out the client-side method of synchronized determination of rate control, in accordance with the methods and steps described herein by way of example.

d. Example Base Station

Figure 8:
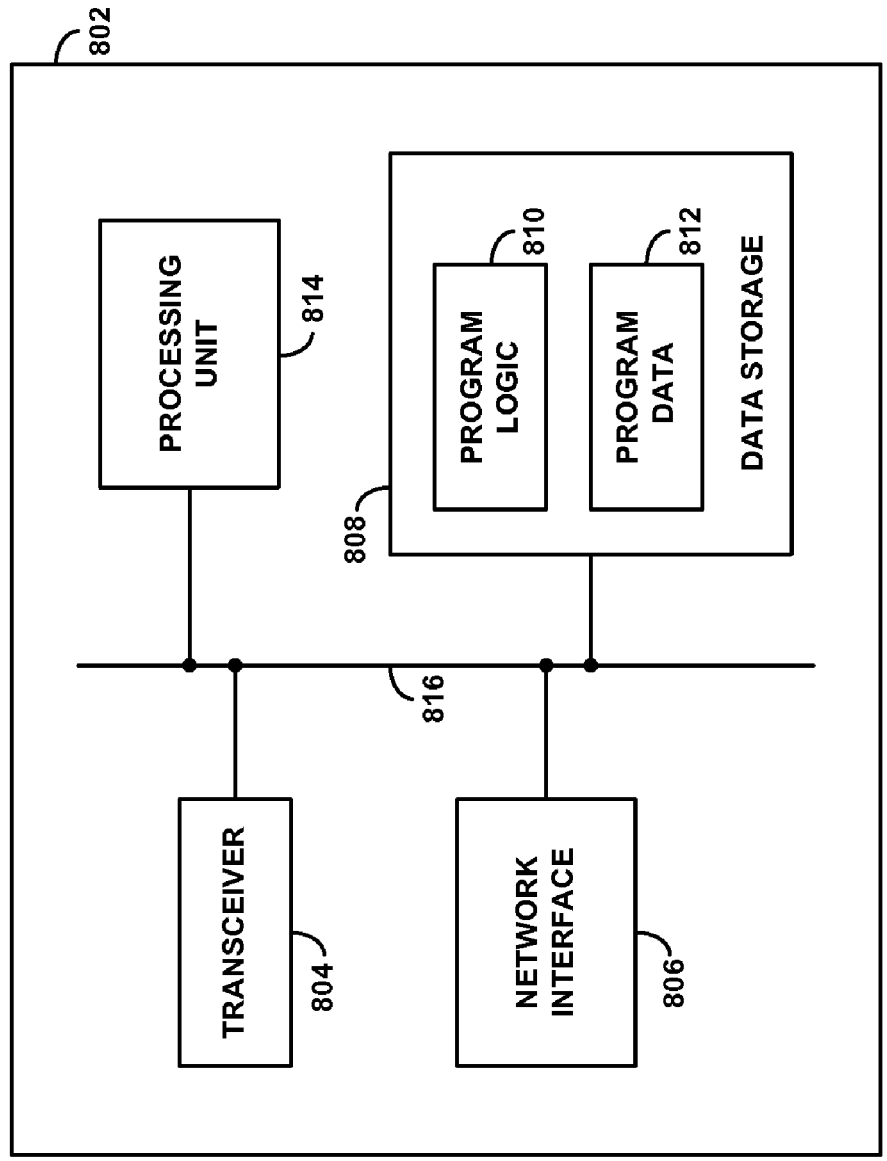
FIG. 8 is a block diagram of an example base station in which synchronized determination of rate control may be implemented.

FIG. 8 is a simplified block diagram depicting functional components of an example base station 802 in which system-side operation of synchronized determination of rate control may be implemented. As shown in FIG. 8, the example base station 802, representative of BTS 204 or BSC 206 integrated with BTS 204 in FIG. 2, for instance, includes a transceiver 804, network interface 806, a processing unit 814, and data storage 808, all of which may be coupled together by a system bus 816 or other mechanism. In addition, the base station may also include external storage, such as magnetic or optical disk storage, although this is not shown in FIG. 8.

These components may be arranged to support conventional operation in a wireless communication network that is compliant with a CDMA family of protocols, such as network 200 illustrated in FIG. 2. The details of such an arrangement and how these components function to provide conventional operation are well-known in the art, and are not described further herein. Certain aspects of base station 802 relevant to dynamic adaptation of synchronized determination of rate control are discussed briefly below.

Network interface 806 enables communication on a network, such network 200. As such, network interface 806 may take the form of trunk or optical link that can be coupled with a TDM switch such as MSC 208, or an Ethernet network interface card or other physical connection that can be coupled with PCF 214, for instance. Further, network interface 806 in combination with transceiver 804, which may include one or more BTS antennas, enables air interface communication with one or more access terminals, supporting forward-link transmissions of protocol version messages, among other message and commands, and supporting reception reverse-link traffic on reverse links.

Processing unit 814 comprises one or more general-purpose processors (e.g., INTEL microprocessors) and/or one or more special-purpose processors (e.g., dedicated digital signal processor, application specific integrated circuit, etc.). In turn, the data storage 808 comprises one or more volatile and/or non-volatile storage components, such as magnetic or optical memory or disk storage. Data storage 808 can be integrated in whole or in part with processing unit 814, as cache memory or registers for instance. As further shown, data storage 808 is equipped to hold program logic 810 and program data 812.

Program logic 810 may comprise machine language instructions that define routines executable by processing unit 814 to carry out various functions described herein. In particular the program logic, communication interface, and transceiver may operate cooperatively to carry out logical operation such as that discussed above and illustrated in FIG. 6.

It will be appreciated that there can be numerous specific implementations of a base station (or BTS or other RAN element), such as base station 802, in which the system-side method of synchronized determination of rate control could be implemented. Further, one of skill in the art would understand how to devise and build such an implementation. As such, base station 802 is representative of means for carrying out the system-side method of synchronized determination of rate control, in accordance with the methods and steps described herein by way of example.

5. Conclusion

An example embodiment of the present invention has been described above. Those skilled in the art will understand, however, that changes and modifications may be made to this embodiment without departing from the true scope and spirit of the invention, which is defined by the claims.

What is claimed:

1. In an access terminal operating in a wireless communication system that includes a base station, a method comprising:
    at the access terminal, setting a reference time for synchronization with at least one other access terminal of periodic computations of time-averaged measures of noise-indication messages received from the base station, wherein the noise-indication messages indicate noise measured by the base station on reverse links of an air interface, and the time-averaged measures are used for determining transmission rates of data to the base station;
    at the access terminal, synchronizing with the reference time a start time of periodic intervals for computing time-averaged measures of periodic noise-indication messages received from the base station, and determining rates for transmission of data to the base station based at least on the time-averaged measures computed for the periodic intervals; and
    at the access terminal, transmitting data to the base station at the determined rates.

2. The method of claim 1, wherein setting the reference time for synchronization comprises receiving the reference time in a message from the base station.

3. The method of claim 1, wherein the access terminal is configured to operate according to a CDMA family of protocols including at least IS-856, Rev. A,
    wherein the base station comprises a BTS and a coverage area, the coverage area being at least one of a cell and a sector, wherein the noise-indication messages each comprise a reverse activity bit (RAB) for the coverage area, wherein computing time-averaged measures of the periodic noise-indication messages received from the base station comprises computing a value of filtered RAB (FRAB) for each of the periodic intervals, and wherein determining rates for transmission of data to the base station based at least on the time-averaged measures comprises applying the computed FRAB values to determinations of reverse-link data rates to the base station.

4. The method of claim 3, wherein the reference time specifies a periodically repeating reference time slot, wherein the periodic intervals are each one or more time slots, and wherein synchronizing with the reference time the start time of the periodic intervals for computing the time-averaged measures of the periodic noise-indication messages received from the base station comprises temporally aligning a first slot of each of the periodic intervals with the periodically repeating reference time slot.

5. The method of claim 1, wherein synchronizing with the reference time the start time of the periodic intervals for computing the time-averaged measures of the periodic noise-indication messages received from the base station comprises:

during initialization of a communication session of the access terminal, receiving at the access terminal a noise-history message from the base station, the noise-history message containing information corresponding to an historical record of noise-indication messages transmitted by the base station prior to the reference time; and at the access terminal, determining an initial time-averaged measure of noise-indication messages for an initial interval preceding the reference time, based on the information contained in the noise-history message.

6. The method of claim 5, wherein the access terminal is configured to operate according to a CDMA family of protocols including at least IS-856, Rev. A, wherein the base station comprises a BTS and a coverage area, the coverage area being at least one of a cell and a sector, wherein the noise-indication messages each comprise a reverse activity bit (RAB) for the coverage area, wherein computing time-averaged measures of the periodic noise-indication messages received from the base station comprises computing a value of filtered RAB (FRAB) for each of the periodic intervals, and wherein determining the initial time-averaged measure of noise-indication messages for the initial interval preceding the reference time comprises determining an initial FRAB for the initial interval preceding the reference time.

7. An access terminal configured to operate in a wireless communication system that includes a base station, the access terminal comprising:

means for setting a reference time used for synchronization with at least one other access terminal of periodic computations of time-averaged measures of noise-indication messages received from the base station, wherein the noise-indication messages indicate noise measured by the base station on reverse links of an air interface, and the time-averaged measures are used for determining transmission rates of data to the base station;

means for synchronizing with the reference time a start time of periodic intervals for computing time-averaged measures of periodic noise-indication messages received from the base station;

means for determining rates for transmission of data to the base station based at least on the time-averaged measures computed for the periodic intervals; and means for transmitting data to the base station at the determined rates.

8. The access terminal of claim 7, wherein setting the reference time used for synchronization comprises receiving the reference time in a message from the base station.

9. The access terminal of claim 7, wherein the access terminal is further configured to operate according to a CDMA family of protocols including at least IS-856, Rev. A, wherein the base station comprises a BTS and a coverage area, the coverage area being at least one of a cell and a sector, wherein the noise-indication messages each comprise a reverse activity bit (RAB) for the coverage area, wherein computing time-averaged measures of the periodic noise-indication messages received from the base station comprises computing a value of filtered RAB (FRAB) for each of the periodic intervals, and wherein determining rates for transmission of data to the base station based at least on the time-averaged measures comprises applying the computed FRAB values to determinations of reverse-link data rates to the base station.

10. The access terminal of claim 9, wherein the reference time specifies a periodically repeating reference time slot, wherein the periodic intervals are each one or more time slots, and wherein synchronizing with the reference time the start time of the periodic intervals for computing the time-averaged measures of the periodic noise-indication messages received from the base station comprises temporally aligning a first slot of each of the periodic intervals with the periodically repeating reference time slot.

11. The access terminal of claim 7, wherein synchronizing with the reference time the start time of the periodic intervals for computing the time-averaged measures of the periodic noise-indication messages received from the base station comprises:

during initialization of a communication session of the access terminal, receiving a noise-history message from the base station, wherein the noise-history message contains information corresponding to an historical record of noise-indication messages transmitted by the base station prior to the reference time; and determining an initial time-averaged measure of noise-indication messages for an initial interval preceding the reference time, based on the information contained in the noise-history message.

12. The access terminal of claim 11, wherein the access terminal is further configured to operate according to a CDMA family of protocols including at least IS-856, Rev. A, wherein the base station comprises a BTS and a coverage area, the coverage area being at least one of a cell and a sector, wherein the noise-indication messages each comprise a reverse activity bit (RAB) for the coverage area, wherein computing time-averaged measures of the periodic noise-indication messages received from the base station comprises computing a value of filtered RAB (FRAB) for each of the periodic intervals, and wherein determining the initial time-averaged measure of noise-indication messages for the initial interval preceding the reference time comprises determining an initial FRAB for the initial interval preceding the reference time.

13. In a base station configured to operate as part of a wireless communication system and further configured to serve a plurality of access terminals, including a first access terminal and a second access terminal, a method comprising:
while serving the first access terminal but not the second access terminal in an active communication session, broadcasting from the base station periodic noise-indication messages that indicate noise measured by the base station on reverse links of an air interface; and
thereafter, during initialization of a communication session of the second access terminal, transmitting from the base station a noise-history message to the second access terminal, the noise-history message containing information corresponding to an historical record of noise-indication messages broadcast by the base station prior to a reference time for synchronization among the plurality of access terminals of periodic computations of time-averaged measures of noise-indication messages broadcast by the base station.

14. The method of claim 13, further comprising transmitting the reference time from the base station to the second access terminal.

15. The method of claim 13, wherein the base station is further configured to operate according to a CDMA family of protocols including at least IS-856, Rev. A,
wherein the base station comprises a BTS and a coverage area, the coverage area being at least one of a cell and a sector,
and wherein the noise-indication messages each comprise a reverse activity bit (RAB) for the coverage area broadcast periodically by the base station.

16. The method of claim 15, wherein the reference time specifies a periodically repeating reference time slot.

17. The method of claim 15, wherein the noise-history message is selected from a group consisting of a list of RAB values broadcast by the base station during an initial interval preceding the reference time, and a value of filtered RAB (FRAB) computed for the initial interval preceding the reference time.

18. A base station configured to operate as part of a wireless communication system and further configured to serve a plurality of access terminals, the base station comprising:
means for broadcasting periodic noise-indication messages that indicate noise measured by the base station on reverse links of an air interface, while serving the first access terminal in an active communication session; and
means for, during initialization of a communication session of the second access terminal, transmitting a noise-history message to the second access terminal, wherein the noise-history message contains information corresponding to an historical record of noise-indication messages broadcast by the base station prior to a reference time for synchronization among the plurality of access terminals of periodic computations of time-averaged measures of noise-indication messages broadcast by the base station.

19. The base station of claim 18, further comprising means for transmitting the reference time from the base station to the second access terminal.

20. The base station of claim 18, wherein the base station is further configured to operate according to a CDMA family of protocols including at least IS-856, Rev. A,
wherein the base station comprises a BTS and a coverage area, the coverage area being at least one of a cell and a sector,
and wherein the noise-indication messages each comprise a reverse activity bit (RAB) for the coverage area broadcast periodically by the base station.

21. The base station of claim 20, wherein the reference time specifies a periodically repeating reference time slot.

22. The base station of claim 18, wherein the noise-history message is selected from a group consisting of a list of RAB values broadcast by the base station during an initial interval preceding the reference time, and a value of filtered RAB (FRAB) computed for the initial interval preceding the reference time.

* * * * *